US012570249B2

(12) United States Patent
Kim

(10) Patent No.: US 12,570,249 B2
(45) Date of Patent: Mar. 10, 2026

(54) ELECTRIC HYDRAULIC BRAKE

(71) Applicant: HYUNDAI MOBIS CO., LTD., Seoul (KR)

(72) Inventor: Young Kyu Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 601 days.

(21) Appl. No.: 17/968,133

(22) Filed: Oct. 18, 2022

(65) Prior Publication Data

US 2023/0130785 A1 Apr. 27, 2023

(30) Foreign Application Priority Data

Oct. 25, 2021 (KR) ........................ 10-2021-0142848

(51) Int. Cl.
*B60T 7/04* (2006.01)
*B60T 8/40* (2006.01)
(Continued)

(52) U.S. Cl.
CPC ............ *B60T 7/042* (2013.01); *B60T 8/4081* (2013.01); *B60T 8/94* (2013.01); *B60T 13/686* (2013.01); *B60T 2270/403* (2013.01)

(58) Field of Classification Search
CPC .......... B60T 8/4081; B60T 8/94; B60T 8/326; B60T 8/4018; B60T 13/686;
(Continued)

(56) References Cited

U.S. PATENT DOCUMENTS

2015/0061362 A1* 3/2015 Kikawa ................. B60T 8/4077
303/14
2018/0050670 A1* 2/2018 Feigel ................... B60T 13/662
(Continued)

FOREIGN PATENT DOCUMENTS

CN 111284465 A * 6/2020 ............ B60T 8/1755
DE 102018208223 A1 * 11/2019 ............. B60T 8/326
(Continued)

OTHER PUBLICATIONS

English machined translation of DE-102018208223 A1, Nov. 28, 2019.*

(Continued)

*Primary Examiner* — Robert A. Siconolfi
*Assistant Examiner* — San M Aung
(74) *Attorney, Agent, or Firm* — Morgan, Lewis & Bockius LLP

(57) ABSTRACT

According to at least one embodiment, the present disclosure provides an electric hydraulic brake including: a plurality of wheel brakes configured to supply braking force to wheels of a vehicle; a reservoir storing brake oil; a master cylinder connected to the reservoir and configured to generate hydraulic pressure in cooperation with a motor; a hydraulic circuit configured to selectively transmit the hydraulic pressure to the plurality of wheel brakes, the hydraulic circuit including a front wheel hydraulic circuit to transmit the hydraulic pressure to a pair of front wheel brakes, a rear wheel hydraulic circuit to transmit the hydraulic pressure to a pair of rear wheel brakes, and a plurality of solenoid valves; a first controller configured to control the motor and the hydraulic circuit in accordance with braking input; and a second controller configured to control the motor and the front wheel hydraulic circuit when the first controller malfunctions.

12 Claims, 7 Drawing Sheets

(51) Int. Cl.
*B60T 8/94* (2006.01)
*B60T 13/68* (2006.01)

(58) Field of Classification Search
CPC ........ B60T 13/745; B60T 7/042; B60T 17/22;
B60T 2220/04; B60T 2270/403
USPC ...................................................... 303/113.4
See application file for complete search history.

(56) References Cited

U.S. PATENT DOCUMENTS

2018/0334149 A1 * 11/2018 Feigel .................. B60T 13/745
2021/0053542 A1 2/2021 Koo

FOREIGN PATENT DOCUMENTS

DE 102020118827 A1 * 2/2021 ............ B60T 13/745
WO WO-2020204510 A1 * 10/2020 ............ B60T 13/145

OTHER PUBLICATIONS

Extended European Search Report dated Mar. 23, 2023, issued in
corresponding European Patent Application No. 22202586.8.
Office Action issued on Feb. 14, 2024 in European Patent Application No. 22202586.8.

* cited by examiner

| Valve | Type | FIRST CONTROLLER | SECOND CONTROLLER |
|---|---|---|---|
| WSV | NO | ● | |
| FIRST MCV | NO | ● | ● |
| SECOND MCV | NO | ● | |
| LSV | NC | ● | |
| IV RR | NO | ● | |
| IV RL | NO | ● | |
| IV FR | NO | ● | ● |
| IV FL | NO | ● | ● |
| OV RR | NC | ● | |
| OV RL | NC | ● | |
| OV FR | NC | ● | ● |
| OV FL | NC | ● | ● |
| Motor | Dual | ● | ● |
| PS | Dual | ● | ● |
| EPB RL | | | ● |
| EPB RR | | ● | |

*FIG. 2*

ELECTRIC HYDRAULIC BRAKE

CROSS-REFERENCE TO RELATED APPLICATIONS

This application is based on, and claims priority from, Korean Patent Application Number 10-2021-0142848, filed on Oct. 25, 2021, the disclosure of which is incorporated by reference herein in its entirety.

TECHNICAL FIELD

The present disclosure relates to an electric hydraulic brake.

BACKGROUND

Description of this section only provides the background information of the present disclosure without configuring the related art.

An electric hydraulic brake generates hydraulic pressure using an electric motor and generates braking force at each wheel cylinder by transmitting the hydraulic pressure to the wheel cylinders. An electric hydraulic brake makes it easy to individually control braking force that is generated at each wheel brake, and accordingly, it is possible to easily implement functions such as an Electronic Stability Control (ESC) System or an Anti-Lock Brake System (ABS).

ESC is for keeping the posture of a vehicle stable when the posture of the vehicle becomes unstable during driving. Factors that make the posture of a vehicle unstable are a slippery road condition due to rain, snow, sand, etc., motion inertia such as rapid zigzag driving, etc. An ESC system keeps the posture of a vehicle stable by controlling a brake and engine torque when the posture of the vehicle is dangerous.

Redundancy design of a brake system is required to prevent danger due to malfunction of a brake system that is electronically operated. For example, when the brake system of a vehicle electronically malfunctions, a driver can directly generate braking force in person by depressing a pedal using foot force. Alternatively, it is possible to configure a brake system in a 2-box type and generate braking force using another brake system when one brake system malfunctions.

However, when a brake system is configured in a 2-box type, there is a problem in that it is physically limited in terms of space to install two brake systems in an engine room. Further, there is another problem in that additional space and parts are needed to connect two controllers through a pipe.

SUMMARY

According to at least one embodiment, the present disclosure provides an electric hydraulic brake including: a plurality of wheel brakes configured to supply braking force to wheels of a vehicle; a reservoir storing brake oil; a master cylinder connected to the reservoir and configured to generate hydraulic pressure in cooperation with a motor; a hydraulic circuit configured to selectively transmit the hydraulic pressure to the plurality of wheel brakes, the hydraulic circuit including a front wheel hydraulic circuit to transmit the hydraulic pressure to a pair of front wheel brakes, a rear wheel hydraulic circuit to transmit the hydraulic pressure to a pair of rear wheel brakes, and a plurality of solenoid valves; a first controller configured to control the motor and the hydraulic circuit in accordance with braking input; and a second controller configured to control the motor and the front wheel hydraulic circuit when the first controller malfunctions.

BRIEF DESCRIPTION OF THE DRAWINGS

FIG. 2 is a table showing a control relationship between first and second controllers and a plurality of solenoid valves of the electric hydraulic brake according to an embodiment of the present disclosure.

DETAILED DESCRIPTION

Figure 1:
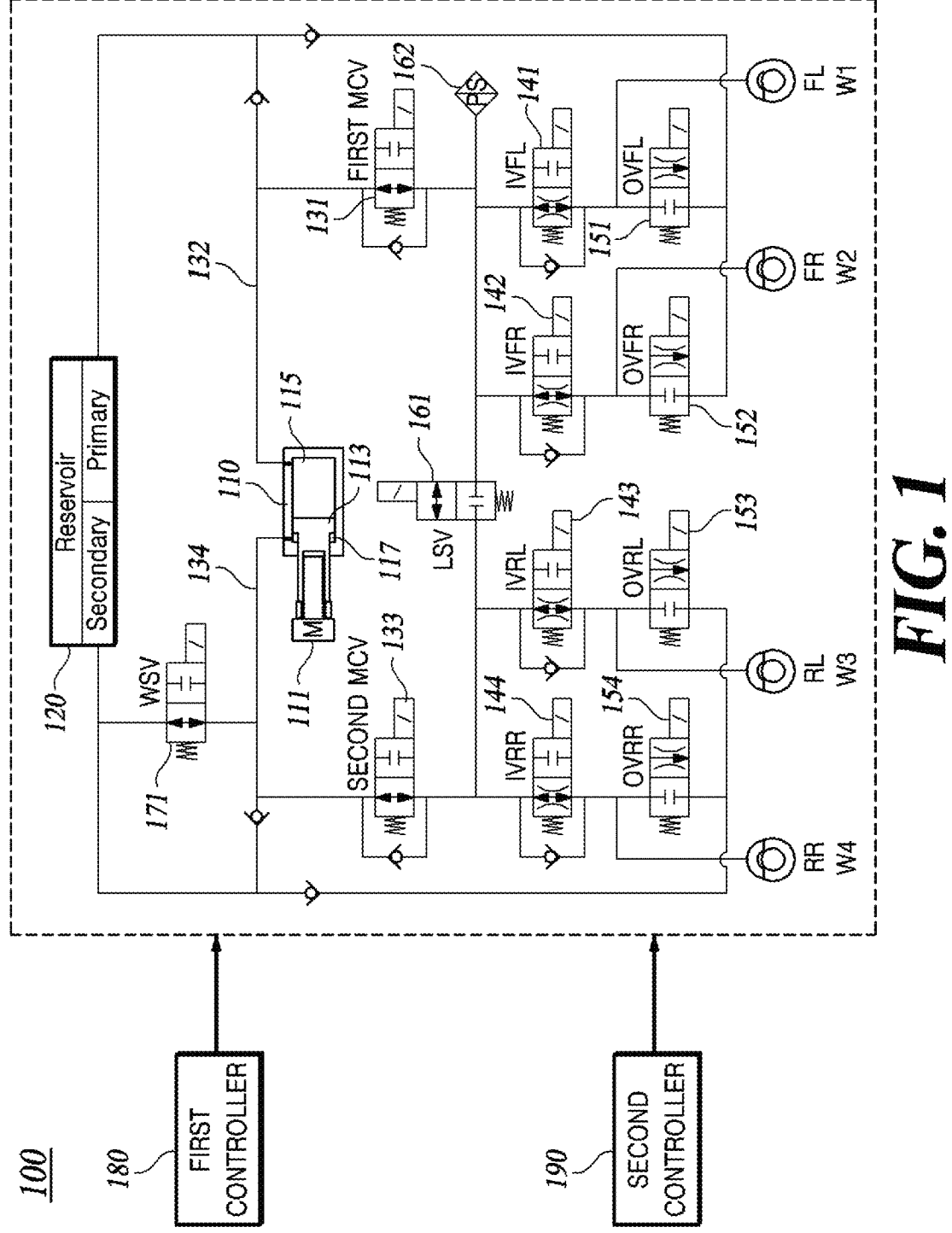
FIG. 1 is a hydraulic circuit diagram of an electric hydraulic brake according to an embodiment of the present disclosure.

An electric hydraulic brake according to an embodiment of the present disclosure can implement redundancy of a brake system of a vehicle by dually designing only a controller in one mechanical package.

The objects of the present disclosure are not limited to the objects described above and other objects will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto. The terms such as 'unit,' 'module,' and the like refer to one or more units for processing at least one function or operation, which may be implemented by hardware, software, or a combination thereof.

FIG. 1 is a hydraulic circuit diagram of an electric hydraulic brake according to an embodiment of the present disclosure.

Referring to FIG. 1, an electric hydraulic brake 100 according to an embodiment of the present disclosure may include all or some of a master cylinder 110, a reservoir 120, a hydraulic circuit, and a controller. The controller may be an Electronic Control Unit (ECU). The controller may include a first controller 180 and a second controller 190.

The master cylinder 110 may include all or some of a motor 111, a ball screw, a piston 113, a first chamber 115, and a second chamber 117.

The master cylinder 110 can generate hydraulic pressure in cooperation with the motor 111. When a driver strokes a brake pedal, the motor 111 is rotated by an electrical signal and the ball screw and the piston 113 linked with the motor 111 are moved forward, so hydraulic pressure can be generated in the master cylinder. When the brake pedal is depressed, the master cylinder can supply the hydraulic pressure to a plurality of wheel brakes w1, w2, w3, and w4. In this case, a forward movement direction means that the piston 113 is moved toward the first chamber 115 and a backward movement direction means that the piston 113 is moved toward the second chamber 117.

The master cylinder 110 may have a dual structure of which the inside is divided into the first chamber 115 and the second chamber by the piston 113. The motor 111 has a dual winding structure, and the first controller 180 and the second controller 190 each may control 50% of the motor 111 under the assumption that the performance of the motor 111 is 100%.

The plurality of wheel brakes w1, w2, w3, and w4 includes a first wheel brake w1 that brakes the front left wheel of a vehicle, a second wheel brake w2 that brakes the front right wheel of the vehicle, a third wheel brake w3 that brakes the rear left wheel of the vehicle, and a fourth wheel brake w4 that brakes the rear right wheel of the vehicle. The first to fourth wheel brakes w1 to w4 are formally defined for the convenience of description and the positions of the first to fourth wheel brakes w1 to w4 are not limited to the positions defined above.

The hydraulic circuit of the electric hydraulic brake 100 may include a front wheel hydraulic circuit and a rear wheel hydraulic circuit. The front wheel hydraulic circuit may be configured to transmit hydraulic pressure to a pair of front wheel brakes w1 and w2. The rear wheel hydraulic circuit may be configured to transmit hydraulic pressure to a pair of rear wheel brakes w3 and w4.

The front wheel hydraulic circuit may include all or some of a first main control valve 131, a first main flow path 132, inlet valves 141 and 142, an inlet flow path, outlet valves 151 and 152, and an outlet flow path.

The first main flow path 132 may be connected to the first chamber 115 of the master cylinder 110 via the first main control valve 131. When the piston 113 is moved forward in accordance with a braking request, brake oil can be transmitted to the plurality of wheel brakes w1 to w4 from the first chamber 115 through the first main flow path 132. The first main control valve 131 can adjust the hydraulic pressure that is transmitted from the first chamber 115 to the plurality of wheel brakes w1 to w4. The first main control valve 131 may be a normal open type solenoid valve that is normally open and operates to close when receiving a closing signal from the controller (ECU).

The front wheel hydraulic circuit may include one or more inlet flow paths diverging from the first main flow path 132 to transmit hydraulic pressure to the front wheel brakes w1 and w2, respectively. The inlet valves 141 and 142 are installed in the inlet flow path and can control the hydraulic pressure, which is transmitted to the front wheel brakes w1 and w2, respectively, when braking is required.

The front wheel hydraulic circuit may include one or more outlet flow paths connecting the front wheel brakes w1 and w2 to the reservoir 120, respectively. The outlet valves 151 and 152 are installed in the outlet flow path and can control the hydraulic pressure, which is discharged from the front wheel brakes w1 and w2, respectively, when braking is stopped.

The rear wheel hydraulic circuit may include all or some of a second main control valve 133, a second main flow path 134, inlet valves 143 and 144, an inlet flow path, outlet valves 153 and 154, and an outlet flow path.

The second main flow path 134 may be connected to the second chamber 117 of the master cylinder 110 via the second main control valve 133. When the piston 113 is moved backward in accordance with a braking request, brake oil can be transmitted to the plurality of wheel brakes w1 to s4 from the second chamber 117 through the second main flow path 134. The second main control valve 133 can adjust the hydraulic pressure that is transmitted from the second chamber 117 to the plurality of wheel brakes w1 to w4. The second main control valve 133 may be a normal open type solenoid valve that is normally open and operates to close when receiving a closing signal from a controller.

The rear wheel hydraulic circuit may include one or more inlet flow paths diverging from the second main flow path 134 to transmit hydraulic pressure to the rear wheel brakes w3 and w4, respectively. The inlet valves 143 and 144 are installed in the inlet flow path and can control the hydraulic pressure, which is transmitted to the front wheel brakes w3 and w4, respectively, when braking is required.

The rear wheel hydraulic circuit may include one or more outlet flow paths connecting the front wheel brakes w3 and w4 to the reservoir 120, respectively. The outlet valves 153 and 154 are installed in the outlet flow path and can control the hydraulic pressure, which is discharged from the front wheel brakes w3 and w4, respectively, when braking is stopped.

The inlet valves 141 to 144 are disposed at the upstream side of the wheel brakes w1 to w4 and may be normal open type solenoid valves that are normally open and operate to close when receiving a closing signal from a controller. The outlet valves 151 to 154 are disposed at the downstream side of the inlet valves 141 to 144 and may be normal closed type solenoid valves that are normally closed and operate to open when receiving an opening signal from a controller.

The electric hydraulic brake 100 according to an embodiment of the present disclosure may further include a fixing valve 161, a mixing flow path, and a recovery valve 171.

The mixing valve 161 may be installed in a mixing flow path connecting the front wheel hydraulic circuit and the rear wheel hydraulic circuit. The mixing valve 161 can control hydraulic pressure that is transmitted between the front wheel hydraulic circuit and the rear wheel hydraulic circuit. The mixing valve 161 may be a Low pressure Switching Valve (LSV). The mixing valve 161 may be a normal closed type solenoid valve that is normally closed and operates to open when receiving an opening signal.

The electric hydraulic brake 100 according to an embodiment of the present disclosure may implement redundancy by dually configuring the first controller 180 and the second controller 190. That is, by dually installing only controller in one mechanical package, even if one controller malfunctions, the other controller can secure braking force of the electric hydraulic brake 100.

The first controller 180 and the second controller 190 each may include a 46-pin connector and a Micro Controller Unit (MCU). A plurality of solenoid valves of the front wheel hydraulic circuit may be connected with the first controller 180 and the second controller 190. That is, even if the first controller 180 malfunctions, the front wheel hydraulic circuit can perform control using the second controller 190. A plurality of solenoid valves of the rear wheel hydraulic circuit may be connected with the first controller 180.

In a normal state, the first controller 180 and the second controller 190 can control the electric hydraulic brake 100 by cooperating with each other. When the first controller 180 malfunctions, the second controller 190 can control a Conventional Brake System (CBS). When the second controller 190 malfunctions, the first controller 180 can control an Electronic Parking Brake (EPB).

FIG. 2 is a table showing a control relationship between first and second controllers and a plurality of solenoid valves of the electric hydraulic brake according to an embodiment of the present disclosure.

Referring to FIG. 2, the first controller 180 can control the front wheel hydraulic circuit and the rear wheel hydraulic circuit. The first controller 180 can control the first main controller 131, the second main controller 133, the inlet valves 141 to 144, the outlet valve 151 to 154, the mixing valve 161, the recovery valve 171, the motor 111, the pedal sensor 162, and the rear wheel right EPB.

The second controller 190 can control the front wheel hydraulic circuit. The second controller 190 can control the first main controller 131, the front wheel inlet valves 141 and 142, the front wheel outlet valve 151 and 152, the motor 111, the pedal sensor 162, and the rear wheel left EPB. The first controller 180 and the second controller 190 can control the hydraulic circuits by cooperating with each other through communication in real time.

The pedal sensor 162 may include two channels and can communicate with the first controller 180 and the second controller 190. The pedal sensor 162 may be positioned in the front wheel hydraulic circuit. However, the position of the pedal sensor 162 is not limited to the position described above as an embodiment.

The first main controller 131, the front wheel inlet valves 141 and 142, and the front wheel outlet valve 151 and 152 that are connected with the second controller 190 can be controlled using the second controller 190 even if the first controller 180 malfunctions. A control method when the first controller 180 or the second controller 190 malfunctions.

Figure 3:
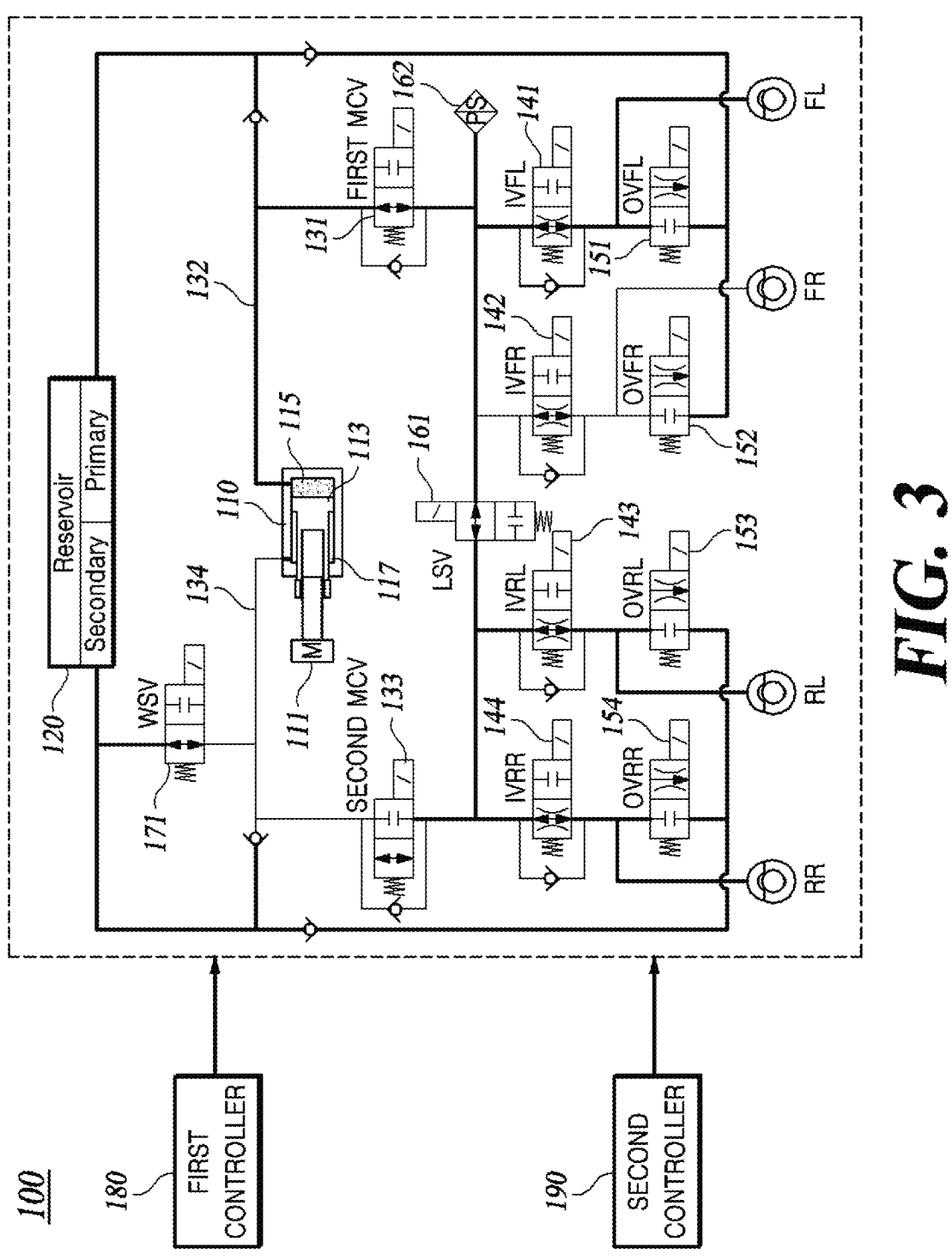
FIG. 3 is a hydraulic circuit diagram showing the flow of brake oil in a normal state of an electric hydraulic brake according to an embodiment of the present disclosure.

FIG. 3 is a hydraulic circuit diagram showing the flow of brake oil in a normal state of an electric hydraulic brake according to an embodiment of the present disclosure.

Referring to FIG. 3, when the motor 111 and the ball screw of the master cylinder 110 malfunction, the electric hydraulic brake 100 can use the auxiliary actuator 120. The auxiliary actuator 120 can generate hydraulic pressure using the pump unit by operating the second motor 121.

When a braking request is generated, the first controller 180 and the second controller 190 rotate the motor 111, and the ball screw and the piston 113 that are linked with the motor 111 are moved forward, so hydraulic pressure is generated in the master cylinder 110. When the piston 113 is moved forward, the hydraulic pressure generated in the master cylinder 110 can be transmitted to the plurality of wheel brakes w1, w2, w3, and w4 via the first main control valve 131, the plurality of inlet valves 141 to 144, and the mixing valve 161.

When a braking request is generated, the first controller 180 can control the second main control valve 133 and the mixing valve 161. The first controller 180 can close the second main control valve 133 by transmitting a closing signal to the second main control valve 133. The first controller 180 can open the mixing valve 161 by transmitting an opening signal to the mixing valve 161.

Referring to FIG. 3, when the electric hydraulic brake 100 does not malfunction, the first controller 180 can control the second main controller 133 with the brake pedal released. The first controller 180 can remove residual pressure by opening and then closing again the second main control valve 133. Hydraulic pressure can be transmitted to the reservoir 120 through the outlet flow path with the brake pedal released.

Figure 4:
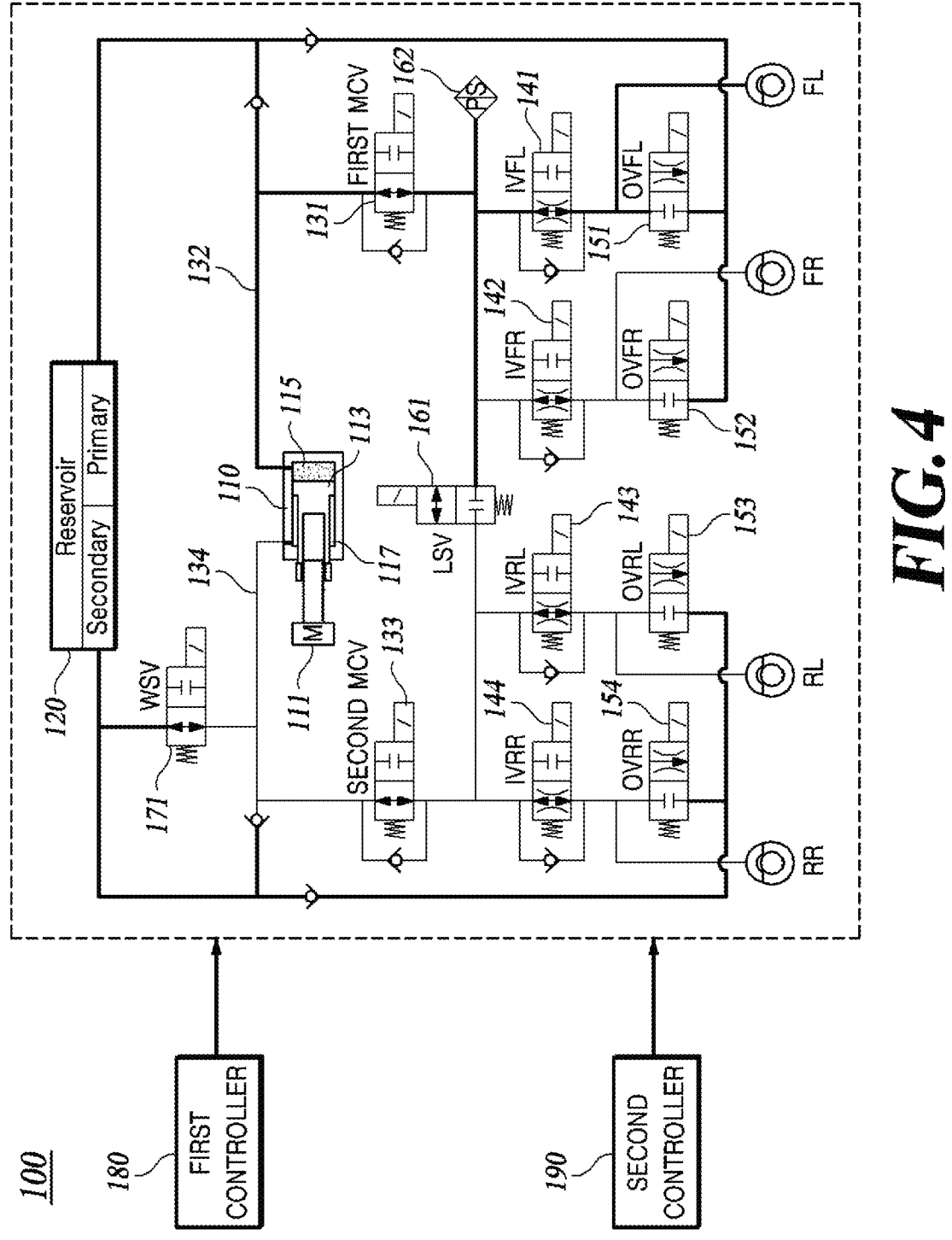
FIG. 4 is a hydraulic circuit diagram showing the flow of brake oil when there is malfunction in a rear wheel hydraulic circuit of the electric hydraulic brake according to an embodiment of the present disclosure.

FIG. 4 is a hydraulic circuit diagram showing the flow of brake oil when there is malfunction in a rear wheel hydraulic circuit of the electric hydraulic brake according to an embodiment of the present disclosure.

When the rear wheel hydraulic circuit malfunctions, the first controller 180 can the mixing valve 161. The first controller 180 can close the mixing valve 161 by transmitting a closing signal to the mixing valve 161.

Referring to FIG. 4, when the rear wheel hydraulic circuit malfunctions, the electric hydraulic brake 100 can generate braking force using only the front wheel hydraulic circuit by closing the mixing valve 161. Further, the first controller 180 and the second controller 190 can remove residual pressure by controlling the front wheel outlet valves 151 and 152 with the brake pedal released.

When the rear wheel hydraulic circuit malfunctions, the electric hydraulic brake 100 can generate braking force using only the front wheel hydraulic circuit and the EPB. Accordingly, the electric hydraulic brake 100 can show performance of about 65% in comparison the normal state. The functions of an Electronic Stability Control System (ESC) and an Anti-Lock Brake System (ABS) of the electric hydraulic brake 100 can be converted into a degraded mode in comparison to the normal state. Further, it is possible to perform cooperative control with steering to secure stability of a vehicle.

Figure 5:
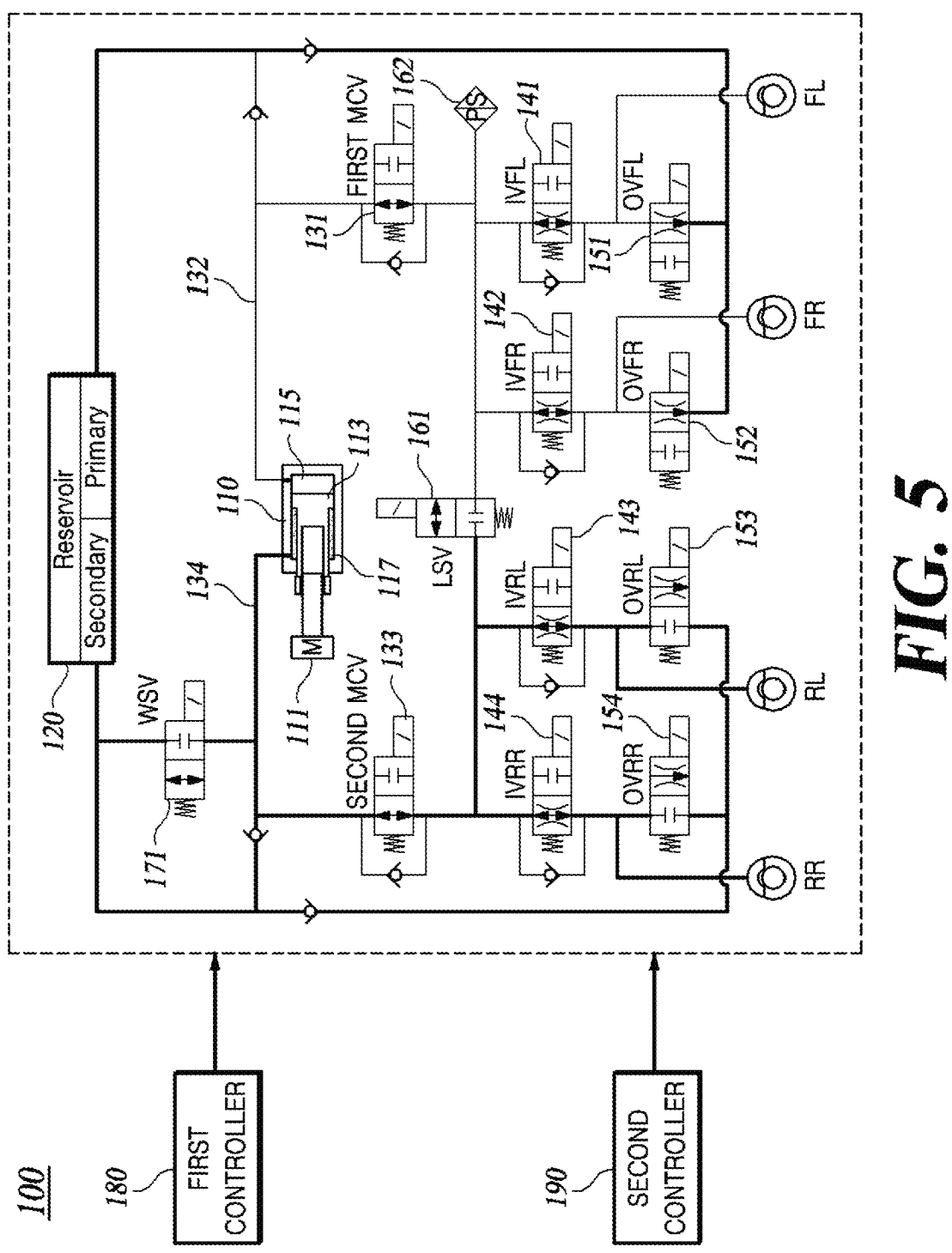
FIG. 5 is a hydraulic circuit diagram showing the flow of brake oil when there is malfunction in a front wheel hydraulic circuit of the electric hydraulic brake according to an embodiment of the present disclosure.

FIG. 5 is a hydraulic circuit diagram showing the flow of brake oil when there is malfunction in a front wheel hydraulic circuit of the electric hydraulic brake according to an embodiment of the present disclosure.

When the front wheel hydraulic circuit malfunctions, the first controller 180 can control the first main control valve 131 and the second main control valve 133. The first controller 180 can close the first main control valve 131 by transmitting a closing signal to the first main control valve 131. The first controller 180 can open the second main control valve 133 by transmitting an opening signal to the second main control valve 133.

Referring to FIG. 5, when the front wheel hydraulic circuit malfunctions, the electric hydraulic brake 100 can generate braking force using only the rear wheel hydraulic circuit by closing the first main control valve 131 and opening the second main control valve 133. Further, the first controller 180 can remove residual pressure by controlling the recovery valve 171 with the brake pedal released.

When the front wheel hydraulic circuit malfunctions, the electric hydraulic brake 100 can generate braking force using only the rear wheel hydraulic circuit and the EPB. Accordingly, the electric hydraulic brake 100 can show performance of about 40% in comparison the normal state. The functions of the electric hydraulic brake 100, such as an ESC and an ABS, can also be converted into a degraded mode in comparison to the normal state. Further, it is possible to perform cooperative control with steering to secure stability of a vehicle.

Figure 6:
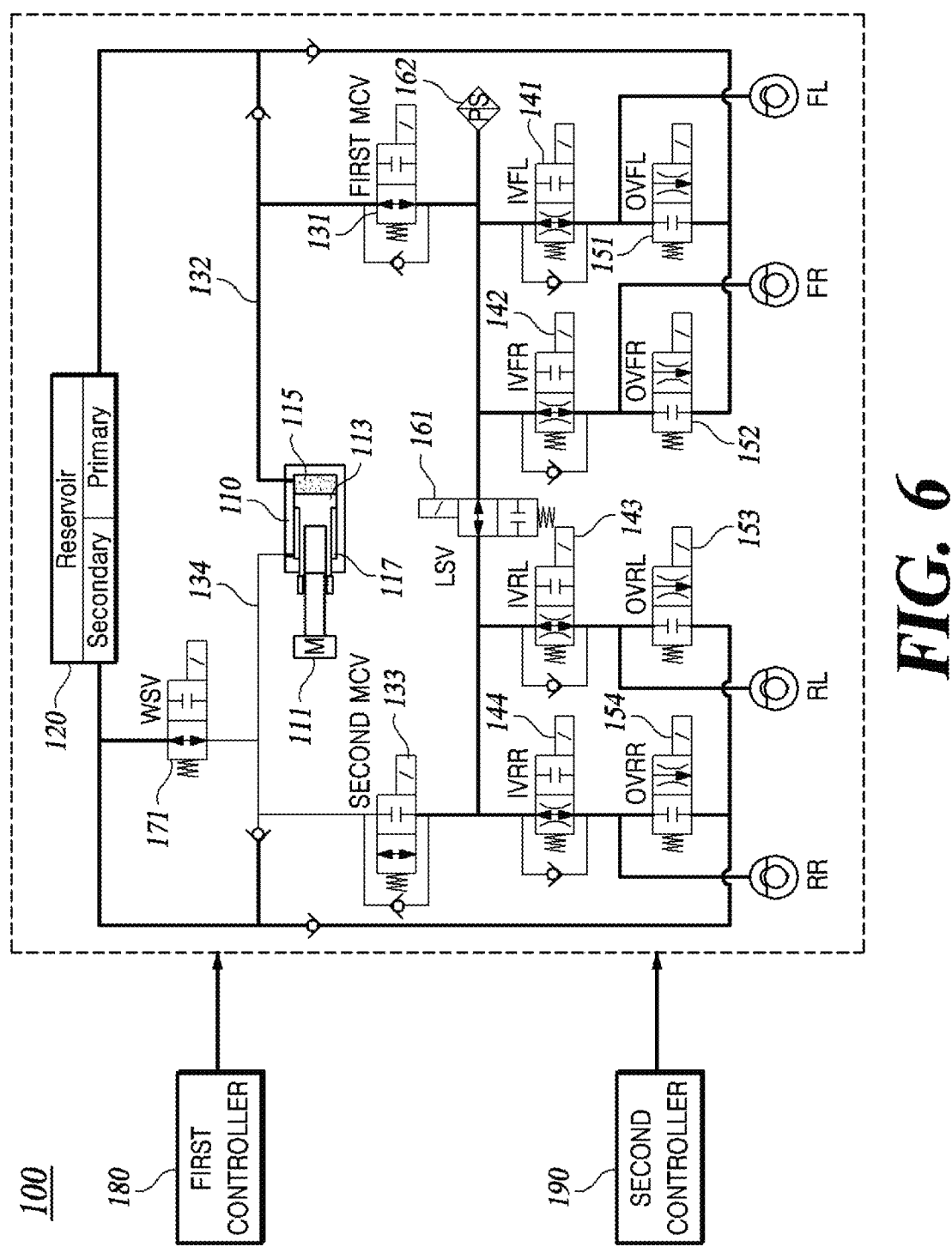
FIG. 6 is a hydraulic circuit diagram showing the flow of brake oil when there is malfunction in a second controller of the electric hydraulic brake according to an embodiment of the present disclosure.

FIG. 6 is a hydraulic circuit diagram showing the flow of brake oil when there is malfunction in a second controller of the electric hydraulic brake according to an embodiment of the present disclosure.

Referring to FIG. 6, even if the second controller 190 malfunctions, it is possible to transmit hydraulic pressure to the plurality of wheel brakes w1, w2, w3, and w4 in the same way as the normal state (Referring to FIG. 3).

When a braking request is generated, the first controller 180 rotates the first motor 111, and the ball screw and the piston 113 that are linked with the first motor 111 are moved forward, so hydraulic pressure is generated in the master cylinder 110. When the piston 113 is moved forward, the hydraulic pressure generated in the master cylinder 110 can be transmitted to the plurality of wheel brakes w1, w2, w3, and w4 via the first main control valve 131, the plurality of inlet valves 141 to 144, and the mixing valve 161.

When a braking request is generated, the first controller 180 can control the second main control valve 133 and the mixing valve 161. The first controller 180 can close the second main control valve 133 by transmitting a closing signal to the second main control valve 133. The first controller 180 can open the mixing valve 161 by transmitting an opening signal to the mixing valve 161. The situation in which the brake pedal is released in the same as the case of FIG. 3. That is, even if the second controller 190 malfunctions, it is possible to control a plurality of solenoid valves using the first controller 190 in the same was as the normal state.

When the second controller 190 malfunctions, the rear wheel left EPB that is controlled by the second controller 190 cannot be used. Further, since the first controller 180 and the second controller 190 control the motor 111 in the ratio of 1:1, the output of the first motor 111 may be limited to 50% of the normal state.

Figure 7:
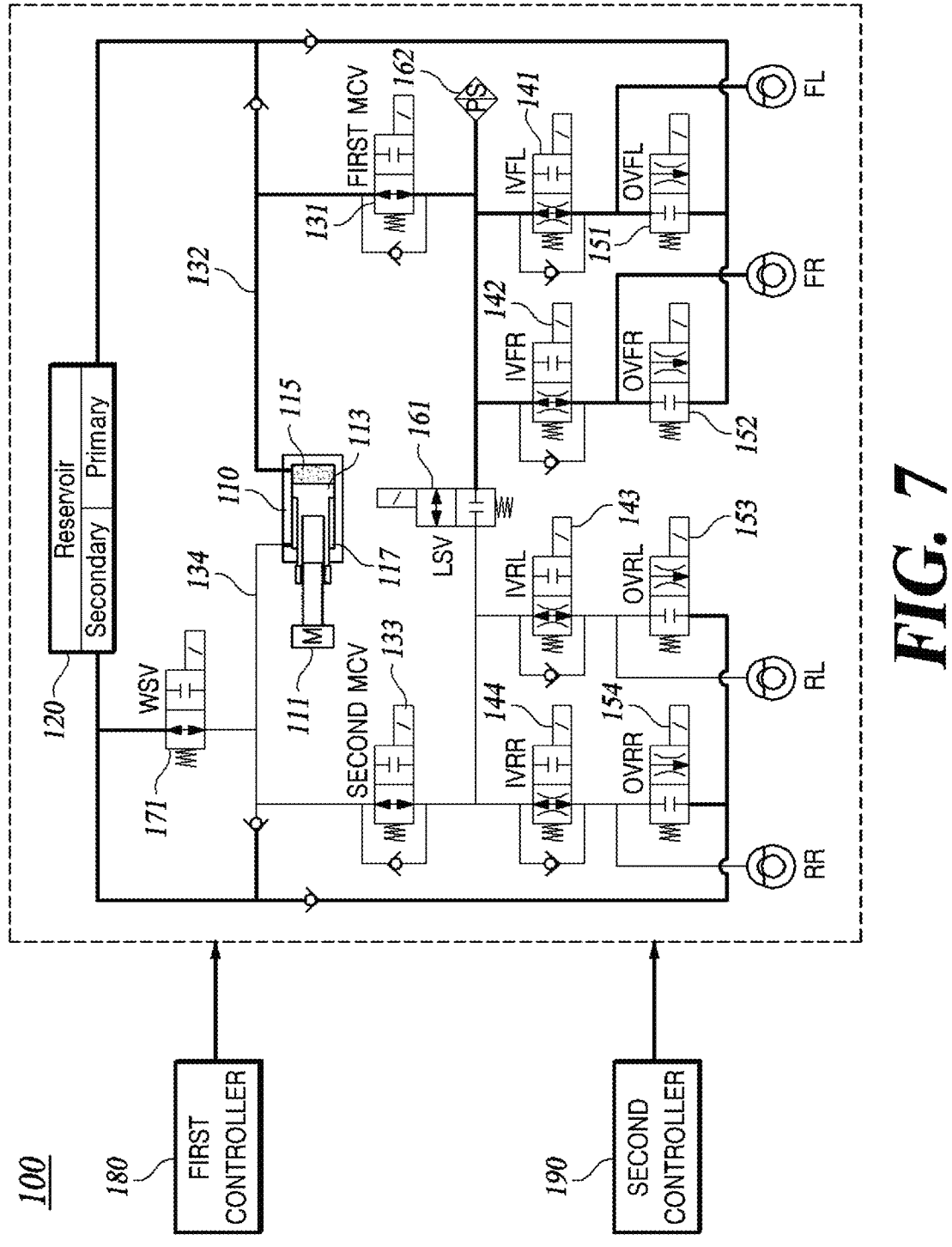
FIG. 7 is a hydraulic circuit diagram showing the flow of brake oil when there is malfunction in a first controller of the electric hydraulic brake according to an embodiment of the present disclosure.

FIG. 7 is a hydraulic circuit diagram showing the flow of brake oil when there is malfunction in a first controller of the electric hydraulic brake according to an embodiment of the present disclosure.

Referring to FIG. 7, when the first controller 180 malfunctions, the electric hydraulic brake 100 can generate braking force using only the front wheel hydraulic circuit.

When the first controller 180 malfunctions, the electric hydraulic brake 100 can generate braking force using only the front wheel hydraulic circuit and the rear wheel left EPB. Accordingly, the electric hydraulic brake 100 can show performance of about 65% in comparison the normal state. The functions of the electric hydraulic brake 100, such as an ESC and an ABS, can also be converted into a degraded mode in comparison to the normal state. Further, it is possible to perform cooperative control with steering to secure stability of a vehicle.

According to an embodiment, the electric hydraulic brake has only a controller dually designed in one mechanical package, so there is an effect that it is possible to implement redundancy of a brake system of a vehicle and to reduce an installation space and the manufacturing cost by decreasing parts.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An electric hydraulic brake comprising:
   a plurality of wheel brakes configured to supply braking force to wheels of a vehicle;
   a reservoir storing brake oil;
   a master cylinder connected to the reservoir and configured to generate hydraulic pressure in cooperation with a motor;
   a hydraulic circuit fluidically connected to the master cylinder and configured to selectively transmit the hydraulic pressure to the plurality of wheel brakes, the hydraulic circuit including a front wheel hydraulic circuit to transmit the hydraulic pressure to a pair of front wheel brakes, a rear wheel hydraulic circuit to transmit the hydraulic pressure to a pair of rear wheel brakes, and a plurality of solenoid valves;
   a first controller electrically connected to the motor and configured to control the motor and the front wheel hydraulic circuit and the rear wheel hydraulic circuit of the hydraulic circuit in accordance with braking input; and
   a second controller electrically connected to the motor and configured to control the motor and the front wheel hydraulic circuit in response that the first controller malfunctions,
   wherein the hydraulic circuit includes a mixing flow path connecting the front wheel hydraulic circuit and the rear wheel hydraulic circuit,
   wherein a mixing valve that is one of the plurality of solenoid valves installed in the mixing flow path and configured to selectively transmit the hydraulic pressure to the plurality of wheel brakes, and
   wherein the mixing valve remains closed when the first controller malfunctions.

2. The electric hydraulic brake of claim 1, wherein the master cylinder
   has a dual structure of which an internal space is divided into a first chamber and a second chamber by a piston, and
   supplies the hydraulic pressure to the plurality of wheel brakes in accordance with a braking signal of one or more of the first controller and the second controller.

3. The electric hydraulic brake of claim 2, wherein the front wheel hydraulic circuit includes:
   a first main control valve configured to control the hydraulic pressure supplied from the first chamber;
   a plurality of inlet valves configured to control the hydraulic pressure that is transmitted to at least one among the pair of the front wheel brakes; and
   a plurality of outlet valves configured to control hydraulic pressure that is transmitted to the reservoir from the at least one among the pair of the front wheel brakes.

4. The electric hydraulic brake of claim 3, wherein the front wheel hydraulic circuit further includes:
   a first main flow path connecting the master cylinder and the first main control valve;

a plurality of inlet flow paths connecting the first main control valve and the at least one among the pair of the front wheel brakes via the inlet valves; and a plurality of outlet flow paths connecting the at least one among the pair of the front wheel brakes and the reservoir.

5. The electric hydraulic brake of claim 2, wherein the rear wheel hydraulic circuit includes:

a second main control valve configured to control the hydraulic pressure supplied from the second chamber;

a plurality of inlet valves configured to control the hydraulic pressure that is transmitted to at least one among the pair of the rear wheel brakes; and a plurality of outlet valves configured to control the hydraulic pressure that is transmitted to the reservoir from the at least one among the pair of the rear wheel brakes.

6. The electric hydraulic brake of claim 5, wherein the rear wheel hydraulic circuit further includes:

a second main flow path connecting the master cylinder and the second main control valve;

a plurality of inlet flow paths connecting the second main control valve and the at least one among the pair of the rear wheel brakes via the inlet valves; and a plurality of outlet flow paths connecting the at least one among the pair of the rear wheel brakes and the reservoir.

7. The electric hydraulic brake of claim 1, wherein the motor has a dual winding structure and each of the first controller and the second controller controls 50% of the motor.

8. The electric hydraulic brake of claim 1, wherein the first controller is further configured to control the motor and the hydraulic circuit when the second controller malfunctions.

9. The electric hydraulic brake of claim 1, wherein the first controller controls a rear wheel right electronic parking brake (EPB), and the second controller controls a rear wheel left EPB.

10. The electric hydraulic brake of claim 1, wherein the first controller and the second controller control the hydraulic circuit by cooperating with each other through communication in real time.

11. The electric hydraulic brake of claim 1, further comprising a 2-channel pedal sensor, wherein the pedal sensor communicates with the first controller and the second controller.

12. The electric hydraulic brake of claim 11, wherein the pedal sensor is disposed in the front wheel hydraulic circuit.

* * * * *